May 14, 1935.  D. H. DAVIS  2,001,411
JACK FOR SEMITRAILERS
Filed July 20, 1931  3 Sheets-Sheet 1
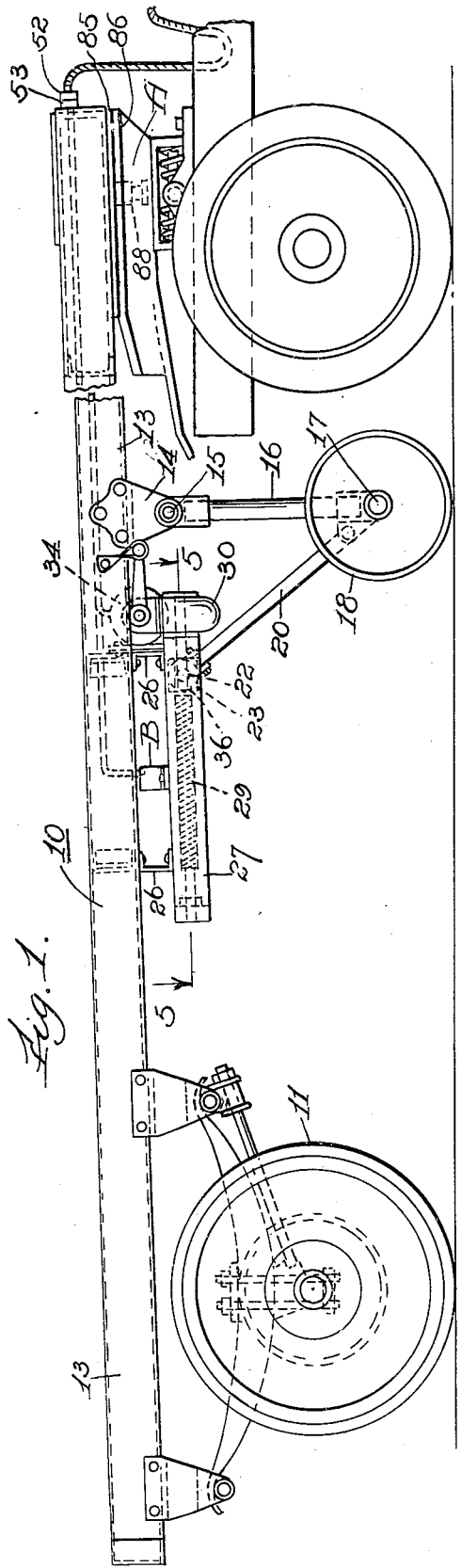
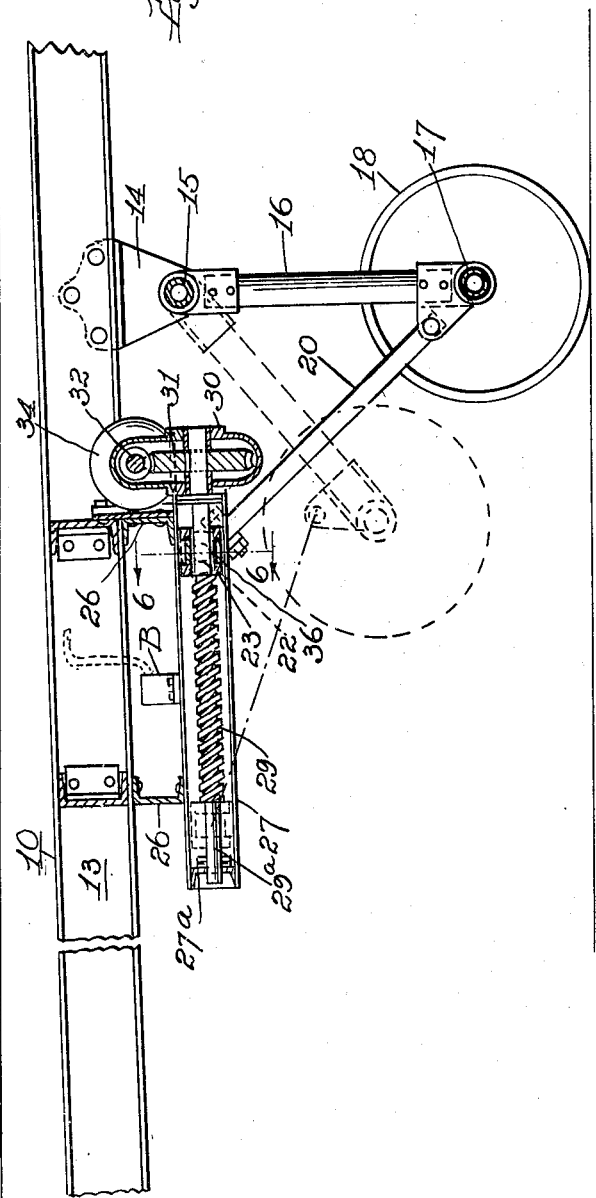
Inventor.
Durrel H. Davis
by Bunton & Bunton
his Attorneys.

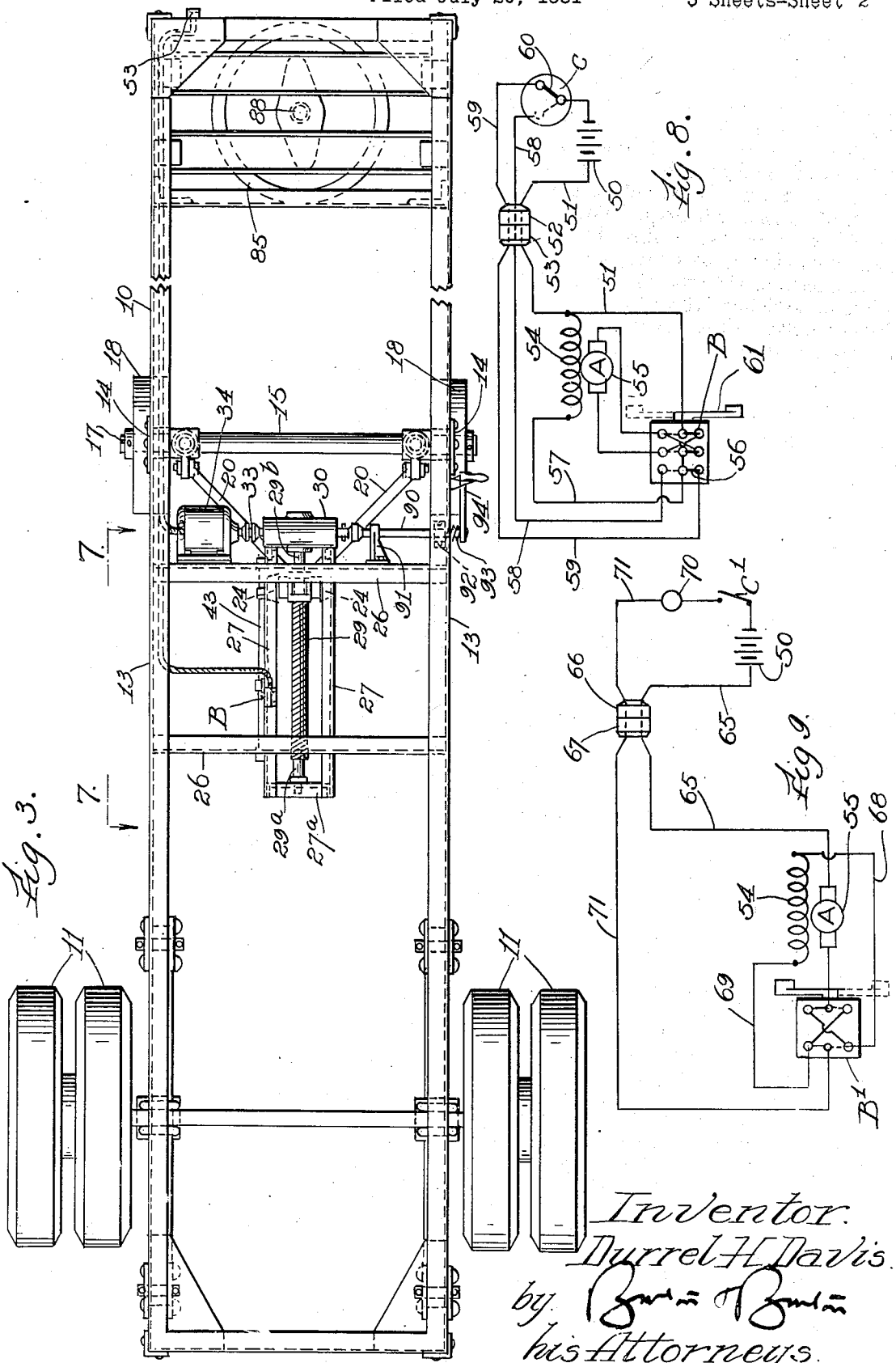

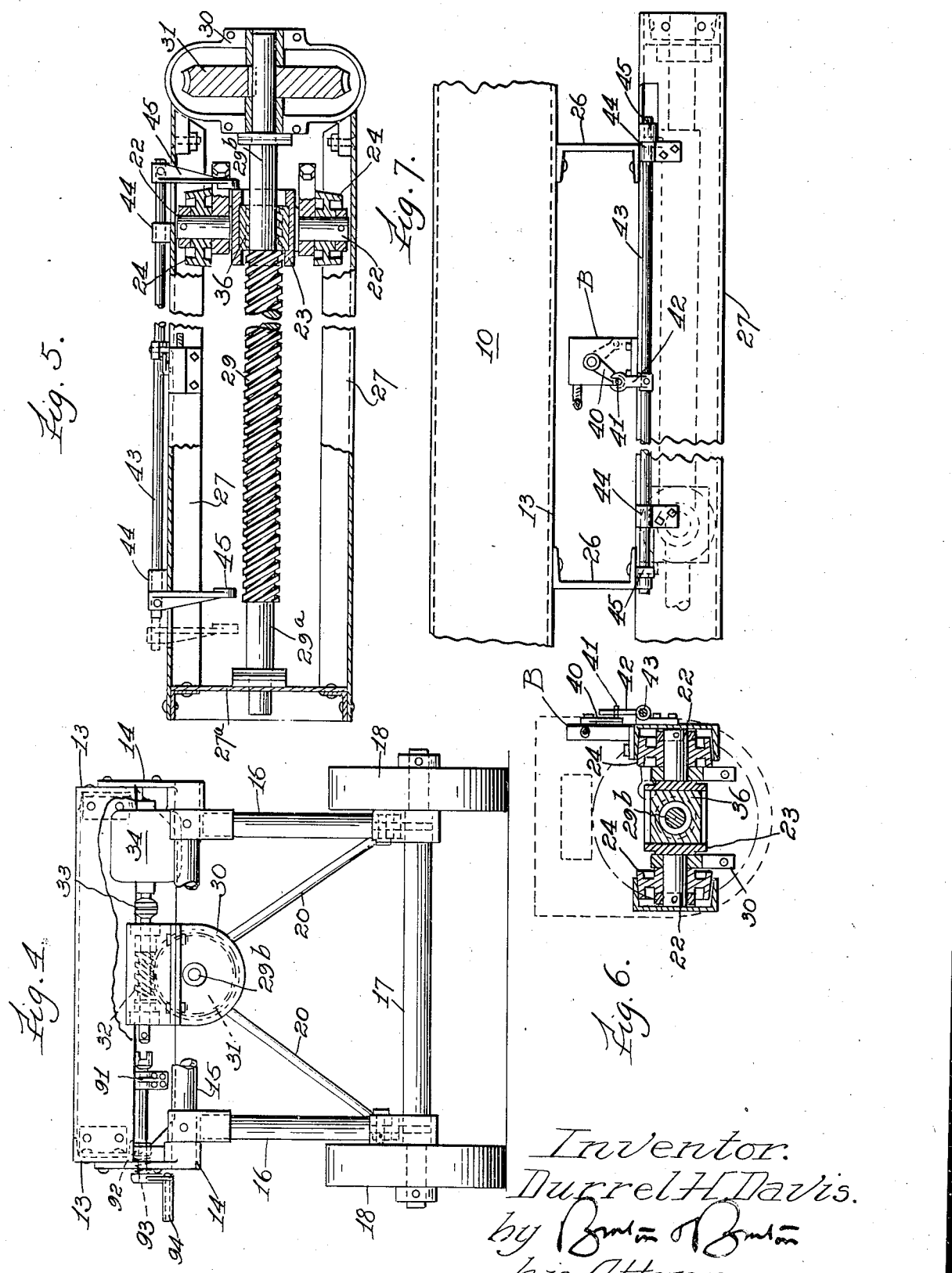

Patented May 14, 1935

2,001,411

UNITED STATES PATENT OFFICE 2,001,411

JACK FOR SEMITRAILERS

Durrel H. Davis, Edgerton, Wis., assignor to Highway Trailer Company, Edgerton, Wis., a corporation of Wisconsin Application July 20, 1931, Serial No. 551,854

2 Claims. (Cl. 280—33.1)

The present invention relates to combined vehicles of the tractor and semi-trailer type, and more particularly to the temporary supports for sustaining the forward end of the trailer when it is uncoupled from the tractor. One of the objects of this invention resides in the provision of an improved temporary support adapted to be actuated by power-operated mechanism carried on the trailer. A further object is to provide electrically controlled operating mechanism for moving the support to and from operating position, and adapted to be remotely controlled at the driver's cab of the tractor. Another object is to provide an improved mechanically actuated temporary supporting structure that is dimensioned and arranged to facilitate coupling and uncoupling of the vehicle units while at the same time substantially eliminating friction between the fifth wheel members (due to the load of the trailer) during coupling and uncoupling of the vehicle units. The invention consists in certain features and elements of construction, in combination, as herein shown and described, and as indicated by the claims.

In the drawings:

Figure 1 is a side elevation of a vehicle provided with a temporary support embodying the present invention; a portion of the tractor being indicated diagrammatically.

Figure 2 is an enlarged fragmentary vertical section taken substantially at the longitudinal center of the vehicle.

Figure 3 is a plan view of the trailer.

Figure 4 is a front end elevation of the trailer with the legs in operative position; parts being broken away to show certain features of construction.

Figure 5 is an enlarged horizontal sectional view taken substantially as indicated at line, 5—5, on Figure 1.

Figure 6 is a transverse vertical section taken substantially as indicated at line, 6—6, on Figure 2.

Figure 7 is a fragmentary view in side elevation of a portion of the trailer showing the automatic reverse for the operating mechanism.

Figure 8 is an electrical wiring diagram of the motor circuit.

Figure 9 is a simplified electrical wiring diagram of the motor circuit.

Referring now in detail to the drawings, the semi-trailer is of conventional construction, including a main frame, 10, and supporting wheels, 11, adjacent its rear end; the forward end of the trailer is shown connected to the tractor, indicated diagrammatically at A, with the temporary support embodying the present invention in position to uphold the trailer when it is uncoupled from the tractor. Secured to the side members, 13, of the main frame are a pair of brackets, 14, in which are journaled the ends of a transversely disposed member, 15, on which are carried the main struts or supporting legs, 16, the lower ends of which are connected to the axle, 17, carrying at its outer ends the ground-engaging wheels, 18. These legs with their supporting wheels, 18, are adapted to be swung about the axis of the transverse supporting member, 15, in the bearing brackets, 14, by control links, 20, which also serve as the brace members for the supporting legs. One end of each of the members, 20, is pivotally connected to one of the supporting legs adjacent its lower end and their opposite ends converge and are pivotally mounted in spaced relation on a pair of oppositely extending trunnions, 22, which are rigidly and integrally connected with a longitudinally reciprocable carriage, 23, of the operating mechanism.

The operating mechanism for controlling the legs is carried on a supporting structure which includes a pair of spaced apart transversely extending structural members 26, attached to the lower flanges of the side frame members, 13, and secured to the under side of these members, 26, are a pair of longitudinally extending transversely spaced channels, 27, rigidly connected at their oposite ends to form a rigid frame structure; the channels being positioned with their flanges extending inwardly providing tracks in which are longitudinally movable guide rolls, 24, journaled on the opposite ends of the trunnion studs, 22, of the carriage, outside of the braces, 20, as seen in Figure 6. Disposed centrally between the channel members, 27, is a longitudinally extending screw, 29, whose ends are reduced as at 29ª and 29ᵇ, the rear end, 29ª, being journaled and supported in the transverse frame member, 27ª, connecting the ends of members, 27, and the forward end, 29ᵇ, being journaled in the gear housing, 30, which serves to enclose co-operating worm-gear elements, 31 and 32, respectively; said housing being supported by and rigidly connected to the opposite ends of the channel members, 27. Mounted on the reduced end, 29ᵇ, of the screw which extends into the housing, 30, is the worm gear, 31, meshed with the worm, 32, which is operatively connected by a coupling member, 33, to the drive shaft of an electric motor indicated at 34, which in turn is supported on the adjacent transversely extending channel member, 26.

Mounted for longitudinal movement on the screw, 29, is a nut, 36, anchored in the carriage, 23, so that by rotation of the screw in one direction said nut, together with the carriage is caused to move longitudinally in the supporting frame members, 27. Such movement of the carriage is imparted through the brace members, 20, for shifting the supporting legs with the wheels, 18, either to or from operative position about the pivot axis of the transverse member, 15. It will be manifest that by providing for the reversal of the electric motor, 34, the mechanism may be operated to shift the supporting legs in either direction, that is, either into or out of supporting position.

For convenience in coupling and uncoupling of the tractor and trailer units it is desirable that the motor, 34, be remotely controlled from the driver's cab on the tractor, A. The electrical circuit may be any one of several arrangements; in any case it should preferably include a motor reversing switch indicated at B and provided with an operating arm, 40, arranged to be actuated as the traveling nut, 36, reaches either limit of its movement, so that when the shifting of the supporting legs in one direction has been completed, the motor circuit is automatically set up for shifting the legs in the opposite direction the next time the motor is energized. As indicated in Figures 5, 6 and 7, the switch arm, 40, is provided with a crank pin, 41, engaging in the forked end of a shifter arm, 42, on a slidably mounted rod, 43, carried in suitable guide brackets, 44, on one of the members, 27. Each end of the rod carries a tappet arm, 45, and as shown in Figure 5, the carriage, 23, with which the end, 36, is associated engages one of these tappets, 45, to shift the rod, 43, and rock the switch arm, 40. When the nut, 36, travels to the other end of the screw, 29, the carriage, 23, will similarly engage the other tappet, 45, and shift the rod, 43, back in the opposite direction. The movement of the rod is limited by abutment of the hubs of the tappets, 45, against the brackets, 44.

In addition to the reversing switch, B, the circuit will include a control switch, C, preferably located in the cab of the tractor, A, and serving primarily to connect the motor, 34, with a source of electrical energy such as a storage battery, which may be carried either on the tractor or on the trailer, as may be preferred. If the storage battery is located on the trailer a supplemental control switch (not shown) may be provided on the trailer itself to permit operation of the support when the trailer is disconnected from the tractor. Occasionally this may be useful for altering the height of the front end of the trailer by limited shifting of the supports, but for most methods of use this feature is unnecessary.

Figure 8 is a wiring diagram for a suitable circuit. From the battery, 50, one wire, 51, leads through a separable connection plug having one part, 52, mounted on the tractor and the other part, 53, on the trailer. The feed wire, 51, continuing through the plug is shown connected to the motor field, 54, and to the switch, B, which in this instance is indicated as of the three-pole double throw type. Two blades or contact arms of this switch serve the purpose of reversing the direction of current through the armature, 55, of the motor and the remaining arm, 56, controls the flow of current through the field, 54, by which it is connected by a wire, 57. The two alternative leads, 58 and 59, from the switch arm, 56, extend back through the separable plug to the control switch, C, through which they are alternatively coupled to the battery, 50, when the switch arm, 60, is swung from one of its limiting positions to the other. The extending end of the connecting bar, 61, by which the three blades of the switch, B, are simultaneously operable corresponds to the crank pin, 41, of the arm, 40, shown in Figures 5, 6 and 7 for actuating the switch, B. With the circuit indicated in Figure 8 it will be seen that swinging the switch blades from one position to the other not only reverses the armature of the motor but transfers the field connection from the lead wire, 59, to the wire, 58, or vice versa. This opens the field circuit and requires that the switch arm, 60, be swung to its other limit in order to close the circuit again, and when it is thus closed the motor, 34, will be operated in the opposite direction.

Figure 9 shows another circuit which does not involve the alternative leads to the control switch but instead includes a pilot light, 70, which informs the operator when the nut, 36, has traveled the length of the screw, 29, and arrived at either limit thereof. A wire, 65, leads from the battery, 50, through the parts, 66 and 67 of the separable plug to the armature, 55, of the motor and thence through a reversing switch, B¹, by way of wire, 68 or wire, 69, (depending upon the position of the switch) to the field coil, 54. The return wire, 71, is shown leading back to the control switch indicated at C¹. The pilot light, 70, being in series with the motor will go out temporarily while the reversing switch, B¹, is being shifted and will thus inform the operator that the nut, 36, has reached one limit of its travel and he may then open the switch, C¹, to prevent reverse movement of the parts until desired.

It will be understood that the separable plug connections between the tractor and trailer as indicated in the diagrams will include a sufficient length of flexible lead wires to accommodate the relative movements of the tractor and trailer when coupled, and also to permit uncoupling of the fifth wheel parts and limited separation of the vehicles before the driver must dismount from his cab to manually disconnect the separable plug. It may also be understood that if desired the wire 51, of Figure 8, or the wire, 65, of Figure 9 may be replaced by any suitable metallic connection between the vehicles capable of carrying a current and this portion of the circuit may then be grounded on the frames of the tractor and trailer.

It will be noted from Figure 1 of the drawings that the supporting legs, 16, are dimensioned so that when disposed in operative position the forward end of the trailer is supported upwardly inclined slightly above the plane normally assumed in traveling position. This feature of construction in connection with the remote control for operation of the legs is considered of great importance since it disposes the upper fifth wheel element, 85, on the trailer at a height which may be substantially flush with the co-operating surface of the upper fifth wheel member, indicated at 86, on the tractor, when it is in horizontal position and the springs on the tractor are free,— that is, before they have assumed any of the load of the trailer. It will be understood that the tractor, A, illustrated is of conventional type having locking means for the king pin controlled from the cab of the tractor. It will therefore be apparent that the friction incident to the coupling by contact of the fifth wheel members will be practically eliminated and the locking means on the tractor element may freely engage or disengage the king pin, 88, on the upper fifth wheel member, and when the fifth wheels are actually locked together the operator in the cab may then, by operation of the switch, C or C¹, of the electric circuit, cause the supporting legs to be moved to inoperative position, and during such movement the springs of the tractor are then permitted to gradually assume the load at the forward end of the trailer. Likewise during uncoupling of the vehicles the operator may while sitting in the cab close the electrical circuit and cause the supporting legs to be moved to operative supporting position, and in so doing it will be manifest that the supporting legs will substantially relieve the tractor of the load of the forward end of the trailer permitting the springs to assume their normal free position. Then the locking means on the tractor may be released from the king pin, 88, and the tractor freely pulled out from under the forward end of the trailer.

To insure that the supporting legs can be manipulated in the event that something goes wrong with the electrical circuit, there is provided a manually operable connection for shifting the legs to and from operative position. This mechanism includes a shaft, 90, journaled in brackets, 91 and 92, and disposed in axial alignment with the axis of the worm; said shaft and adjacent end of the worm being provided with co-operating coupling connections so as to permit engagement and rotation of one by the other. This shaft, 90, is preferably normally held out of engagement with the end of the worm by a coil spring, 93, interposed between the bracket, 92 and the handle member, 94, by means of which said shaft may be rotated for imparting rotation to the screw, and thereby shifting the supporting legs to or from operative position.

Although I have shown a preferred embodiment of the present invention, it will be manifest that it is capable of substantial modification and rearrangement of parts without departing from the spirit and scope of the invention. I therefore do not wish to be understood as limiting myself to the particular construction herein disclosed except as indicated in the appended claims.

I claim:

1. In combination with a tractor and a semitrailer detachably coupled thereto, temporary supporting means carried by the trailer adjacent its forward end and adjustable into and out of operative supporting position, an electric motor on the trailer, mechanism through which said motor is connected to the temporary supporting means for adjusting the latter into and out of operative position, a source of electrical energy on one of the vehicle units and a disengageable electric coupling to be disconnected when the vehicles are uncoupled, a reversing switch for said motor, and means cooperating with the said mechanism for actuating said switch when the supporting means arrives at either limit of its range of adjustment, together with a second switch in said circuit located on the tractor and adapted for opening and closing the motor circuit at will.

2. In the combination defined in claim 1, switch means connected with said reversing switch for actuation therewith and controlling two alternative branches of the circuit, said switch on the tractor being arranged for alternatively connecting said branches to the motor at will, whereby the motor is automatically stopped when the reversing switch is actuated and may be started at will in reverse direction by means of the switch on the tractor.

DURREL H. DAVIS.